P. H. BREED.
AUTOMOBILE DRIVING AND SUPPORTING WHEEL.
APPLICATION FILED JULY 14, 1909.
980,055.
Patented Dec. 27, 1910.
2 SHEETS—SHEET 2.
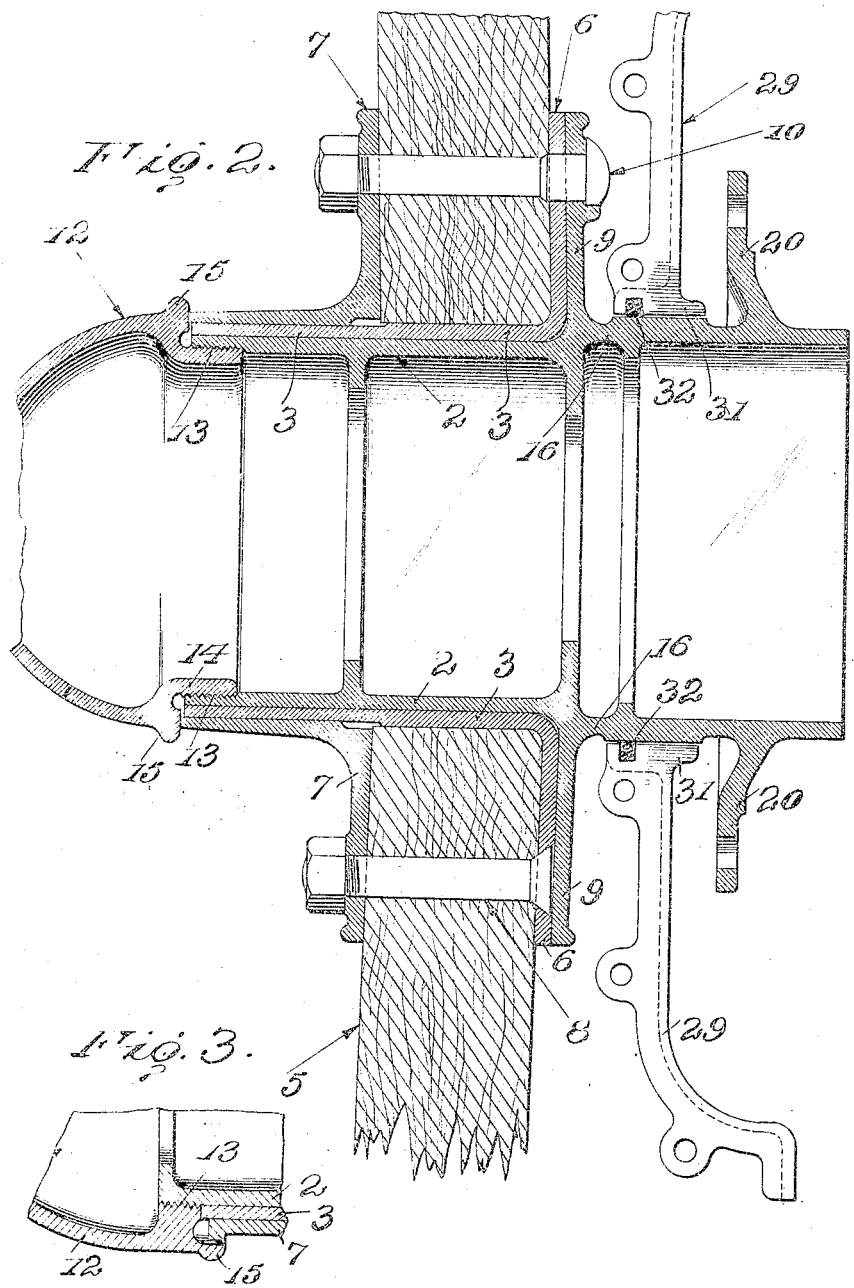
WITNESSES:
W. A. Williams
L. S. Anket
INVENTOR
P. H. Breed
by A. S. Patton
ATTORNEY

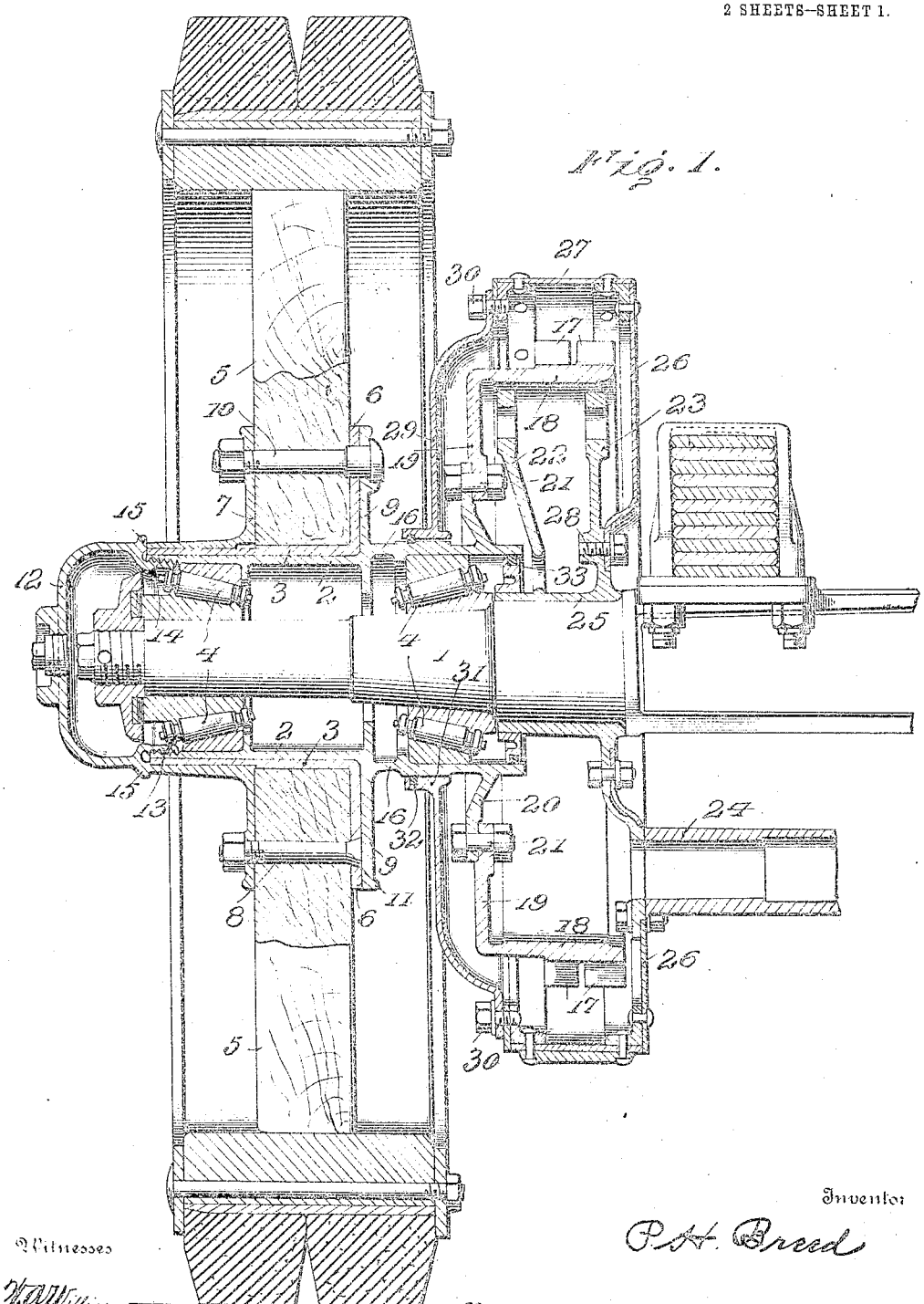

UNITED STATES PATENT OFFICE.

PRESTON H. BREED, OF PITTSFIELD, MASSACHUSETTS, ASSIGNOR TO THE ALDEN SAMPSON MANUFACTURING COMPANY, OF PITTSFIELD, MASSACHUSETTS.

AUTOMOBILE DRIVING AND SUPPORTING WHEEL.

980,055.

Specification of Letters Patent.

Patented Dec. 27, 1910.

Application filed July 14, 1909. Serial No. 507,647.

*To all whom it may concern:*

Be it known that I, PRESTON H. BREED, a citizen of the United States, residing at Pittsfield, in the county of Berkshire and State of Massachusetts, have invented certain new and useful Improvements in Automobile Driving and Supporting Wheels, of which the following is a specification, reference being had therein to the accompanying drawing.

This invention relates to improvements in automobile driving and supporting wheels, and pertains more particularly to that type to which driving sprockets are operatively attached.

The primary object of the present invention is to so arrange and construct the wheel and its coöperating parts that the wheel can be detached from the driving hub without disturbing the driving mechanism, or the driving hub bearings.

In the accompanying drawings, Figure 1 is a vertical sectional view taken through the center of the wheel. Fig. 2 is an enlarged central sectional view, omitting the driving mechanism, and showing only part of the chain case. Fig. 3 shows a modification in the construction of the hub-cap.

The present improvements are shown as applied to a sprocket and chain driven supporting and driving wheel, though some of its features are capable of use with other forms of driving mechanism. In this type, 1 is a stationary supporting axle which is attached to the vehicle in any desired manner.

In carrying out the present invention, a main or driving hub 2, and an auxiliary, or wheel hub 3 are provided. When the improvement is used with the stationary axle and sprocket and chain type here shown, the main or driving hub 2 is journaled on the axle, as for instance, the roller or other bearings 4, which are so well understood by those skilled in the art that further description is unnecessary. This arrangement however will be modified when applied to other forms of driving mechanism as may be required.

The spokes 5 of the wheel radiate from the auxiliary or wheel hub 3. The inner end of this hub is provided with a lateral annular flange 6, and the inner ends of the spokes 5 are clamped between the flange 6 and an outer annular L-shaped flange 7, by means of a suitable number of bolts 8. An annular flange 9 projects from the driving hub 2 intermediate its ends, and when the wheel with its auxiliary hub 3 is placed on the driving hub, the flanges 6 and 9 of the two hubs fit against each other as shown, and are clamped together by a suitable number of bolts 10. These bolts clamp the two hubs together, and cause the auxiliary hub and the wheel to rotate with the driving hub. The heads 11 of the bolts 8 for the auxiliary hub are counter-sunk in the flange 6, as shown, to permit the flanges 9 and 6 to fit against each other as illustrated.

A cap 12 is provided for the driving hub, and as shown in Figs. 1 and 2, the outer end of the driving hub has internal screw threads 13, and the cap external screw threads 14 meshing therewith. The cap closes the open outer end of the driving hub, and is provided with an annular flange 15 projecting across the outer end of the auxiliary hub 3, and can be used to assist in forcing the said hub to position on the driving hub, and also to assist in holding or locking the auxiliary hub on the driving hub.

From the foregoing it will be seen that the wheel and its auxiliary hub, which constitute a complete wheel, can be readily removed from the driving hub without disturbing the latter, and as will be explained hereinafter, without disturbing in any manner the driving mechanism.

As shown the inner end 16 of the driving hub projects inward beyond the flange 9, and to this end of the hub, the driving sprocket teeth 17 are attached. This sprocket may be made of various forms without affecting the primary invention here disclosed, but in the form here shown it is cup-shaped in cross-section, with the sprocket teeth 17 on the outside of its rim 18, with its part 19 attached to an annular flange 20 of the hub by bolts 21. By this arrangement, the inner side of the rim 18 is utilized as a braking drum or surface, and the parts of the expanding brake (not shown) will be supported by the parts 22, 23 and 24.

A driving chain (not shown) of course coöperates with or engages the sprocket teeth 17, and a chain case is supported by the stationary axle 1. In carrying out this part of the construction, a sleeve 25 is rigidly attached to the axle 1, and the inner wall 26 of the chain case 27 is bolted to this sleeve by the bolts 28. The outer wall 29 is preferably detachably connected with the case 27, by bolts 30, and the inner edge of this wall has an annular opening, the wall 31 of which is provided with a suitable dust excluding and oil retaining padding 32. A suitable packing 33 is also arranged between the inner side of the inner end of the driving hub, and the axle.

From the foregoing description and illustration, it will be understood, that the wheel with its auxiliary hub can be easily detached without disturbing the chain, its adjustment, the sprocket wheel, the chain case, or the wheel bearings, and also enables a dust proof and oil retaining construction to be made.

I have here disclosed the preferred form of the invention, but variations may be made therein without departing from the scope of the broad invention.

The wheel is here shown as having spokes, but it is to be understood that variations as to this usual construction may be made without departing from the invention, and the use of the term "spokes" in the claims is to be construed to include other forms which perform the function of the "spokes" mentioned in the claims.

Having thus described my invention, what I claim and desire to secure by Letters Patent is:

1. The combination with a stationary axle, of a wheel comprising an auxiliary hub, a main hub detachably telescoping the auxiliary hub, a driving member attached to the inner end of the main hub, and a casing secured to the axle embracing the driving member and having the inner edge of its outer wall surrounding the inner end of the hub for the purpose described.

2. The combination with a stationary axle, of a wheel comprising an auxiliary hub, a main hub detachably telescoping the auxiliary hub, the inner end of the main hub carrying a driving member, a casing embracing the driving member, the inner wall of the casing firmly attached to the axle, and a detachable outer wall having its inner edge fitting closely the inner portion of the hub.

In testimony whereof I affix my signature in presence of two witnesses.

PRESTON H. BREED.

Witnesses:
REGINALD W. CORLEY,
GUY E. MITCHELL.